Patented Apr. 19, 1938

2,114,713

UNITED STATES PATENT OFFICE 2,114,713

PROCESS OF DISPERSING PIGMENTS AND PRODUCTS THEREOF

Robert Tyler Hucks, South River, and George Raymond Maher, New Brunswick, N. J., assignors to E. I. du Pont de Nemours & Company, Wilmington, Del., a corporation of Delaware No Drawing. Application February 28, 1935, Serial No. 8,688

3 Claims. (Cl. 134—79)

This invention relates to a process for preparing a pigmented product and more particularly to a process for preparing a treated pigment for use in the manufacture of cellulose derivative enamels.

In the manufacture of cellulose nitrate enamels the usual procedure is to dehydrate the water wet fibrous cellulose nitrate by means of alcohol either in a hydraulic press, centrifuge or other suitable device. The resulting dehydrated material must be broken up in order that it can be satisfactorily dispersed in solvents or dispersing media. The nitrocellulose is usually dissolved or dispersed in suitable solvents by means of an agitator mixer to form a so-called base solution.

Precipitated pigments are manufactured by reacting the proper ingredients to precipitate the pigment in a fine state of subdivision. This pigment slurry is then filter pressed, dried and ground in the dry state to break up the larger aggregates which are formed during the filtering and drying treatment. The pigment is then ground in a solution of resins together with plasticizers and in some cases part of the nitrocellulose "base" solution. After suitable grinding to reduce further the pigment aggregates and to wet the pigment so as to prevent further flocculation, this mixture is added in an agitator mixer to the cellulose nitrate solution described above together with additional solvents, softeners, etc., to form the final cellulose nitrate enamel.

While this procedure of manufacture has yielded coating compositions of marked value, which find extensive application, certain improvements, both with respect to simplification of manufacture and improvement in quality of the product prepared, are desired.

This invention has as an object the provision of a process for dispersing pigments in cellulose derivative coating compositions whereby manufacturing procedure is greatly simplified, thus affording substantial operating economies.

A further object of the invention is the provision of a process for dispersing pigments in cellulose derivative vehicles, whereby considerable improvement in the quality of the finish obtained from these compositions is obtained.

A still further object is the provision of a composition of matter containing dispersed pigment in such a state that an acceptable coating composition is obtained by the addition of the necessary other ingredients desired in the finished coating composition with simple agitation.

These objects are accomplished in the present invention by grinding together a cellulose derivative in the water wet state with a pigment press cake to which is added an emulsion, the emulsion subsequently being broken and the water separated from the mass, leaving it in such state that an improved coating composition may be produced by a simple mixing of the required ingredients comprising the final composition.

In practicing the process of the present invention, the pigment in slurry form, that is, suspended in an aqueous medium, is ground with water wet nitrocellulose in the undissolved state in the presence of an emulsion of a suitable agent such as hereinafter described. The water is then separated by convenient methods to provide a product which is capable of forming an improved cellulose derivative coating composition by the addition of the customary ingredients and the use of a simple agitator mixer.

By way of illustration but not by way of limitation, the following examples are given:

Example 1

| | Pounds |
|---|---|
| Toluidine toner press cake (70% water) | 33.3 |
| Cellulose nitrate (65% water) | 42.9 |
| Water | 107.0 |
| Blown castor oil emulsion | 16.0 |

A satisfactory procedure is as follows: Five pounds blown castor oil are thoroughly mixed with one pound of an emulsifying agent as triethanolamine oleate. To this is added ten pounds of water gradually with vigorous agitation until a uniform emulsion results.

The pigment pulp, water wet cellulose nitrate and water in the ratio indicated above are ground in a ball mill with steel balls in the ratio of 3 parts by weight of steel balls to 1 part by weight of charge for a period of 24 hours. In some cases pebbles may be the preferred grinding medium. Other methods of grinding may also be used such as kneading processes or passing the mixture through a colloid mill. The charge is then transferred to an agitator mixer and the oil emulsion added gradually during intensive agitation. After a uniform mixture has been produced, the emulsion may be broken by the addition of a small amount of an acid, such as citric acid. The slurry is then conveniently filtered by any of the well known methods such as filter pressing, centrifuging, etc. An "Oliver" filter drier is particularly useful in this connection since the mass may be readily dried on this equipment immediately following removal of the larger part of the water, thus eliminating the need of additional drying equipment. With this filter drier a cake of the pigment-cellulose nitrate mixture is cast on a rotary drum where it may be conveniently dried by means of warm air. The resulting product is soft and fluffy and may be readily pulverized if desired. The product may be wet with alcohol or some other similar liquid if desired, in order to provide a material with less fire hazard and to permit safer storage until manufacture of the ultimate enamel. Other lacquer ingredients such as plasticizers, solvents, diluents, resins, etc., may be added and with ordinary agitator mixing an enamel may be produced which is equal to and superior in certain respects to enamels produced by methods commonly practiced in the present art.

Example 2

|  | Pounds |
|---|---|
| Chrome yellow press cake (45% water) | 18.9 |
| Cellulose nitrate (65% water) | 35.7 |
| Water | 53.6 |
| Blown castor oil emulsion | 8.7 |

This product is prepared in substantially the same manner as that outlined in Example 1. It will be noted however, that much less emulsified agent is required for this particular pigment in producing a satisfactory product. In general the amount of emulsified agent required will vary with each particular pigment so treated but this optimum condition may be readily determined by those skilled in the art without departing from the spirit of the invention as disclosed herein.

Example 3

|  | Pounds |
|---|---|
| Chinese blue press cake (75% water) | 40.0 |
| Cellulose nitrate (65% water) | 57.2 |
| Water | 110.0 |
| Blown castor oil emulsion | 16.0 |
| Soya lecithin emulsion | 7.0 |

In the case of the Chinese blue product as produced according to the present invention, it has been found that the use of a second emulsifying agent (soya lecithin) contributes materially to the successful handling of this type of pigment. The soya lecithin emulsion is prepared by adding water in the proportions of six pounds of water to one pound of soya lecithin with intensive agitation. It is also preferred to utilize stainless steel balls during the first stage grinding operation to prevent any possible reaction of the nitrocellulose with ordinary steel balls. This tendency however may be counteracted by introducing a small amount of zinc oxide into the mill prior to grinding. With the exceptions just noted the procedure follows generally that outlined for Example 1.

Example 4

|  | Pounds |
|---|---|
| Bone black | 10 |
| Cellulose nitrate (65% water) | 37.4 |
| Water | 50.0 |
| Oleic acid emulsion | 4.0 |

The composition of the oleic acid emulsion used in this example is:

|  | Pounds |
|---|---|
| Triethanolamine oleate | 0.1 |
| Water | 2.9 |
| Oleic acid | 1.0 |
|  | 4.0 |

The emulsifying agent (triethanolamine oleate) and water in the proportions indicated are thoroughly mixed and the oleic acid then added with intensive agitation to form the desired emulsion.

Due to the fact that the bone black pigment contains appreciable quantities of water soluble salts which interfere with the proper functioning of the emulsified agent, it has been found advantageous to wash the mill slurry once or twice with fresh water prior to the final step of adding the emulsion. The procedure, with this exception, is the same as that indicated for Example 1.

As previously indicated the amount of emulsified agent found to be effective in producing the desired results varies with the type of pigment treated but in general will fall within the limits of from 0.25 to 20 parts of treating agent (blown castor oil, oleic acid, etc., as distinguished from the emulsion containing these agents) to 10 parts of pigment, depending upon the particular agent used.

The examples, with the exception of Example 4, show the use of pigment press cake, the product of an intermediate stage in the manufacture of pigments which is higher in pigment concentration, but the process is equally operable in using pigment slurry, the product of an earlier stage in pigment manufacture which is more dilute in pigment—for example, in the case of Chinese blue the concentration of pigment is 5%. Obviously concentrations between the slurry form and the press cake form may be utilized by proper adjustment of water ratios. The practical range is from 5–50% pigment in the slurry. It is possible to use this class of pigments as commercially marketed at the present time, that is, in their dry and pulverized form. In this case the dry pigment is suspended in water and treated as described in Example 4.

The cellulose nitrate-pigment ratio and amount in the product may be that required in the final coating composition. In instances of this character, only solvents, diluents, plasticizers, resin solutions, etc., need be added to the dry cellulose nitrate pigment product in the proper proportions in an ordinary agitator mixer to produce an enamel of superior properties.

In some cases, however, it may be desirable to maintain the cellulose nitrate content of the mixture at a minimum, but at sufficient magnitude to insure adequate and intimate contact of the pigment particles with the surface of the cellulose nitrate particles. In this case in order to provide a sufficient amount of cellulose nitrate in the final coating composition, it is necessary to add along with the other lacquer ingredients enumerated above in an agitator mixer, a suitable proportion of cellulose nitrate "base" solution of the type heretofore commonly used in manufacturing cellulose nitrate enamels. This does not detract from the commercial merits of the invention since it still permits the use of "predispersed" pigments in producing improved final products by the more simple and economical agitator mixing of most of the enamel ingredients.

The product of the invention is of a powdery nature and readily pulverizable. In case of some pigments, the product is of soft texture and pieces break up to a fine powder with but little pressure while for the blue, the pieces are somewhat harder but in any case may be readily dispersed in the added lacquer ingredients by ordinary mixing. The presence of the uncolloided cellulose nitrate is not visibly apparent since it has been ground to a very fine state and is thoroughly admixed and coated with the pigment particles.

Cellulose nitrate in any convenient physical form may be used as for example nitrated cotton linters, nitrated wood pulp, pre-colloided nitrated cotton as smokeless powder, nitrated regenerated cellulose, etc. If desired, it is also possible to use alcohol wet nitrocellulose, in which form it is usually commercially available, but the nitrocellulose in this state involves a loss of the alcohol or requirements for its recovery and it is preferred to utilize a water wet material.

Other materials than those mentioned in the examples which are used in the emulsion form are natural and synthetic resins, linseed oil, carnauba wax, metallic soaps, etc. Care must be exercised, however, that no material is used which will dissolve or disperse the cellulose nitrate.

Other well known emulsifying agents than those mentioned in the examples, such as sodium oleate, sodium ricinoleate, glyceryl oleate, diglycol stearate and ammonium hydroxide may be used, the latter agent being somewhat restricted in its use since in many cases it may deleteriously affect certain pigments.

The emulsion may be prepared in the method described, that is, by vigorous agitation or by any other well known methods as high speed colloid mill, etc. The use of an acid such as citric acid may not always be required to break the emulsion in the process since in certain cases the pigment may contain sufficient water soluble salts to break the emulsion at the proper time.

This process has been found to be broadly applicable to all classes of pigments and is not limited to chemically precipitated pigments alone. Pigments prepared by other well known methods as well as naturally occurring pigments also lend themselves to treatment by the process of the invention. Classes of such pigments are zinc oxide, titanium oxide, ferrite yellow, ultramarine blue, iron oxide, burnt umber, carbon black, etc. So-called fillers such as china clay may also be treated by the process of the invention.

The process is also adaptable to dispersing pigments in other cellulose derivatives such as cellulose ethers and cellulose acetate by following the procedure as outlined for dispersion in cellulose nitrate.

In the examples the wet cellulose nitrate is indicated as having about 65% water. This amount is not particularly critical and may vary over a very wide range, up to 80-90% water or even greater.

If desired the procedure may be modified to be of somewhat greater commercial practicability, in which case the cellulose nitrate is subjected to a preliminary grinding in water whereby the cellulose nitrate is uniformly comminuted. This material may be stored in the slurry form and used as needed thus providing a convenient base for use in manufacturing any colored product desired. It is added in proper proportions to the pigment pulp and thoroughly mixed with an agitator mixer or passed through a colloid mill. The emulsified agent is then added with vigorous agitation and the process carried to completion as previously described.

We have also found that very good results will be obtained if the pigment slurry is prepared as indicated above, and placed in a ball mill together with the above indicated amount of cellulose derivative, an oil, and an emulsifying agent, and the entire mass ground until satisfactory dispersion has been effected.

An alternative procedure which has also given outstanding results provides for the addition of a previously prepared oil emulsion to a pigment slurry-cellulose derivative mixture in a ball mill. This mixture is then ground in the mill until a satisfactory dispersion has been effected. If necessary, an electrolyte may then be added to break the emulsion, after which the product is filtered and dried.

While no limitation is placed on a theory as to the actual working of the invention, the following is proposed as a probable theory of the practical non-agglomeration of the pigment particles in the final composition made with the pigments treated according to the process of the invention.

As the pigment is prepared by chemical precipitation, it exists in a high degree of subdivision with a minimum of agglomeration. During the drying process, however, agglomeration takes place and these agglomerates are only broken with considerable difficulty and in many cases not at all so that the original high degree of subdivision is never attained in the dispersion of the pigment in the vehicle. By treating the pigment in its state of high degree of subdivision with suitable agents the agglomeration in subsequent drying is practically eliminated and the pigment retained to a large extent in the condition of a high degree of sub-division in which it is precipitated.

The process of the invention is particularly adaptable to the preparation of cellulose derivative coating compositions particularly those based on cellulose nitrate. The process of the invention is also applicable to the preparation of cellulose derivative plastics.

The process is also of particular value in permitting the manufacture of an intermediate product of the finished coating composition which is of particular utility to producers of pigmented enamels who are not equipped to carry out the more elaborate pigment dispersion process. Other uses will be readily apparent to those skilled in the art.

This invention presents as advantages marked economies in manufacturing costs with respect to pigment dispersion and production of final coating composition and reduction in grinding or dispersing periods particularly with respect to pigments ordinarily difficult to disperse.

A further advantage is the provision of an intermediate product for use in the manufacture of cellulose derivative compositions in a one-stage operation thus providing greater flexibility in the manufacture of the cellulose derivative compositions, in that the situation of other lacquer ingredients in type and in ratio is permitted over a wide range to afford numerous composition modifications.

A still further advantage is the provision of enamels of improved quality as evidenced particularly by a cleaner color, higher gloss and freedom from pigment grit and streaks in the coatings produced therefrom.

It is apparent that many widely different embodiments of this invention may be made without departing from the spirit and scope thereof and, therefore, it is not intended to be limited except as indicated in the appended claims.

We claim:

1. Process of preparing pigments for enamels, lacquers, inks, and the like, which comprises forming a slurry of the selected pigment in an extremely finely divided state, adjusting the water content until the slurry contains between 5-50% solids, grinding the said slurry with water wet cellulose nitrate containing about 65% water, agitating the mass while adding an aqueous emulsion of blown castor oil and an emulsifying agent, adding an organic acid to break the emulsion, separating the surplus liquid, and drying the pigment, whereby a mixture of finely divided nitrocellulose and pigment coated with an oil is produced.

2. Process of preparing pigments for enamels, lacquers, inks, and the like which comprises forming an aqueous slurry of a pigment in an extremely finely divided state, adjusting the water content until the slurry contains between 5 and 50% solids, grinding the slurry with water-wet cellulose nitrate, agitating the mixture, and adding an aqueous emulsion of an oil which has no solvent effect on the nitrocellulose, breaking the emulsion, separating the surplus liquid, and drying the pigment-nitrocellulose mixture, whereby a friable mass is obtained which yields a satisfactory lacquer upon the addition of solvents, resins, and plasticizers by simple mixing.

3. Process of preparing pigments for enamels, lacquers, inks, and the like which comprises forming an aqueous slurry containing between 5 and 50% of pigment in an extremely finely divided state, grinding therewith water-wet nitrocellulose until the pigment is uniformly dispersed, and then adding an oil and an emulsifying agent, grinding the mixture until an emulsion is formed, breaking the emulsion, removing the surplus liquid, and drying the product whereby a powdery mass is produced from which lacquers may be prepared by the addition of solvents, plasticizers, and resins with simple mixing, said mass consisting substantially of undissolved nitrocellulose pigment and an oil.

ROBERT TYLER HUCKS.
GEORGE RAYMOND MAHER.